(12) United States Patent
Jung et al.

(10) Patent No.: US 12,493,433 B2
(45) Date of Patent: Dec. 9, 2025

(54) STORAGE DEVICE, STORAGE CONTROLLER, AND OPERATING METHOD OF STORAGE CONTROLLER

(71) Applicant: SAMSUNG ELECTRONICS CO., LTD., Suwon-si (KR)

(72) Inventors: Sangwon Jung, Suwon-si (KR); Insoo Kim, Suwon-si (KR); Choongki Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/392,471

(22) Filed: Dec. 21, 2023

(65) Prior Publication Data

US 2024/0211176 A1      Jun. 27, 2024

(30) Foreign Application Priority Data

Dec. 22, 2022    (KR) ........................ 10-2022-0182180

(51) Int. Cl.
     *G06F 3/06*            (2006.01)

(52) U.S. Cl.
     CPC .......... *G06F 3/0659* (2013.01); *G06F 3/0613* (2013.01); *G06F 3/0688* (2013.01)

(58) Field of Classification Search
     CPC ..... G06F 3/0659; G06F 3/0613; G06F 3/0688
     See application file for complete search history.

(56) References Cited

U.S. PATENT DOCUMENTS

| | | | |
|---|---|---|---|
| 6,170,042 B1 | 1/2001 | Gaertner et al. | |
| 7,917,903 B2 | 3/2011 | Lumb et al. | |
| 8,996,450 B1* | 3/2015 | Rubio | G06F 3/0631 |
| | | | 707/602 |
| 9,292,205 B2 | 3/2016 | Sundrani | |
| 9,367,250 B2 | 6/2016 | Tressler et al. | |
| 10,037,167 B2 | 7/2018 | Kwon et al. | |
| 10,628,216 B2 | 4/2020 | Miao et al. | |
| 11,307,806 B2 | 4/2022 | Tanakamaru et al. | |

(Continued)

OTHER PUBLICATIONS

Zhang, Qi, Yi Liu, and Tao Liu. "IBalancer: load-aware in-server flow scheduling for sub-millisecond tail latency." IEEE Transactions on Parallel and Distributed Systems 33.8 (2021): 1761-1774. (Year: 2021).*

(Continued)

*Primary Examiner* — Nicholas J Simonetti
(74) *Attorney, Agent, or Firm* — Wolf, Greenfield & Sacks, P.C.

(57) ABSTRACT

A storage controller includes: (i) a queue monitoring circuit configured to generate monitoring information about a queue depth (QD) for each of a write command and a read command, (ii) a surge detection circuit configured to generate command-by-command surge information based on the monitoring information, (iii) a priority determination circuit configured to generate priority determination information indicating any one of the write command, the read command, and a default according to the command-by-command surge information, and (iv) a priority reflection circuit configured to variably set each of a priority of the write command and a priority of the read command according to the priority determination information.

17 Claims, 14 Drawing Sheets

(56) References Cited

U.S. PATENT DOCUMENTS

| | | | |
|---|---|---|---|
| 2009/0037924 A1* | 2/2009 | Zohar | G06F 9/505 |
| | | | 711/163 |
| 2009/0070648 A1* | 3/2009 | Allison | G06F 11/106 |
| | | | 714/746 |
| 2011/0019542 A1* | 1/2011 | Bernstein | H04L 47/822 |
| | | | 370/252 |
| 2012/0203986 A1 | 8/2012 | Strasser et al. | |
| 2014/0195744 A1* | 7/2014 | Fleischer | G06F 13/1663 |
| | | | 711/151 |
| 2014/0269288 A1* | 9/2014 | Crisan | H04L 47/2425 |
| | | | 370/231 |
| 2015/0331633 A1 | 11/2015 | Yang et al. | |
| 2020/0409878 A1 | 12/2020 | Liu | |
| 2021/0124499 A1* | 4/2021 | Bert | G06F 3/0611 |
| 2021/0397379 A1 | 12/2021 | Leconte et al. | |
| 2022/0269442 A1 | 8/2022 | Jeong et al. | |

OTHER PUBLICATIONS

Wadekar, Manoj. "Enhanced ethernet for data center: Reliable, channelized and robust." 2007 15th IEEE Workshop on Local & Metropolitan Area Networks. IEEE, 2007. (Year: 2007).*

Han, Kyuhwa, and Dongkun Shin. "Command queue-aware host I/O stack for mobile flash storage." Journal of systems architecture 109 (2020): 101758. (Year: 2020).*

"Extended European Search Report corresponding to European Patent Application No. 23219186.6 (12 pages) (dated Apr. 22, 2024)".

\* cited by examiner

FIG. 7B

| Surge | Priority |
|---|---|
| Read O, Write X | Read |
| Read O, Write O | Default |
| Read X, Write O | Write |
| Read X, Write X | Default |

STORAGE DEVICE, STORAGE CONTROLLER, AND OPERATING METHOD OF STORAGE CONTROLLER

REFERENCE TO PRIORITY APPLICATION

This application claims priority under 35 U.S.C. § 119 to Korean Patent Application No. 10-2022-0182180, filed Dec. 22, 2022, the disclosure of which is hereby incorporated herein by reference.

BACKGROUND

The inventive concept relates to integrated circuit devices and, more particularly, to integrated circuit memory devices, storage controllers, storage devices including the storage controllers, and methods of operating the storage controllers.

As a nonvolatile memory, a flash memory may retain data stored therein even when power supply thereto is interrupted or terminated. Recently, storage devices including flash memories such as embedded multimedia cards (eMMCs), universal flash storages (UFSs), solid state drives (SSDs), and memory cards have been widely used, and storage devices have been usefully used to store or transfer large amounts of data.

In addition, to increase storage capacity, low-latency storage devices have recently been required in various scenarios. For example, in the case of a storage device of a data center, multiple users may simultaneously request a read command and a write command. However, in the case of a storage device of the related art, a high priority is given to a read command in terms of user quality of service (Qos), but the priority is typically fixed. Thus, there is an increasing demand for storage devices capable of variably setting command-by-command priority (i.e., priority for each command) in order to cope with various scenarios.

SUMMARY

The inventive concept provides a storage device capable of variably setting the priority between a write command and a read command based on a queue depth (QD), a storage controller thereof, and an operating method of the storage controller.

According to an aspect of the inventive concept, a storage controller is provided, which includes: (i) a queue monitoring circuit configured to generate monitoring information about a queue depth (QD) for each of a write command and a read command, (ii) a surge detection circuit configured to use the monitoring information to generate command-by-command surge information, (iii) a priority determination circuit configured to generate priority determination information indicating any one of the write command, the read command, and a default according to the command-by-command surge information, and (iv) a priority reflection circuit configured to use the priority determination information to variably set a priority of the write command and a priority of the read command.

BRIEF DESCRIPTION OF THE DRAWINGS

Embodiments will be more clearly understood from the following detailed description taken in conjunction with the accompanying drawings in which:

FIG. 7B is a table illustrating priority command information pre-mapped according to command-by-command surge information according to an embodiment;

DETAILED DESCRIPTION OF THE EMBODIMENTS

Hereinafter, embodiments will be described in detail with reference to the accompanying drawings.

Figure 1:
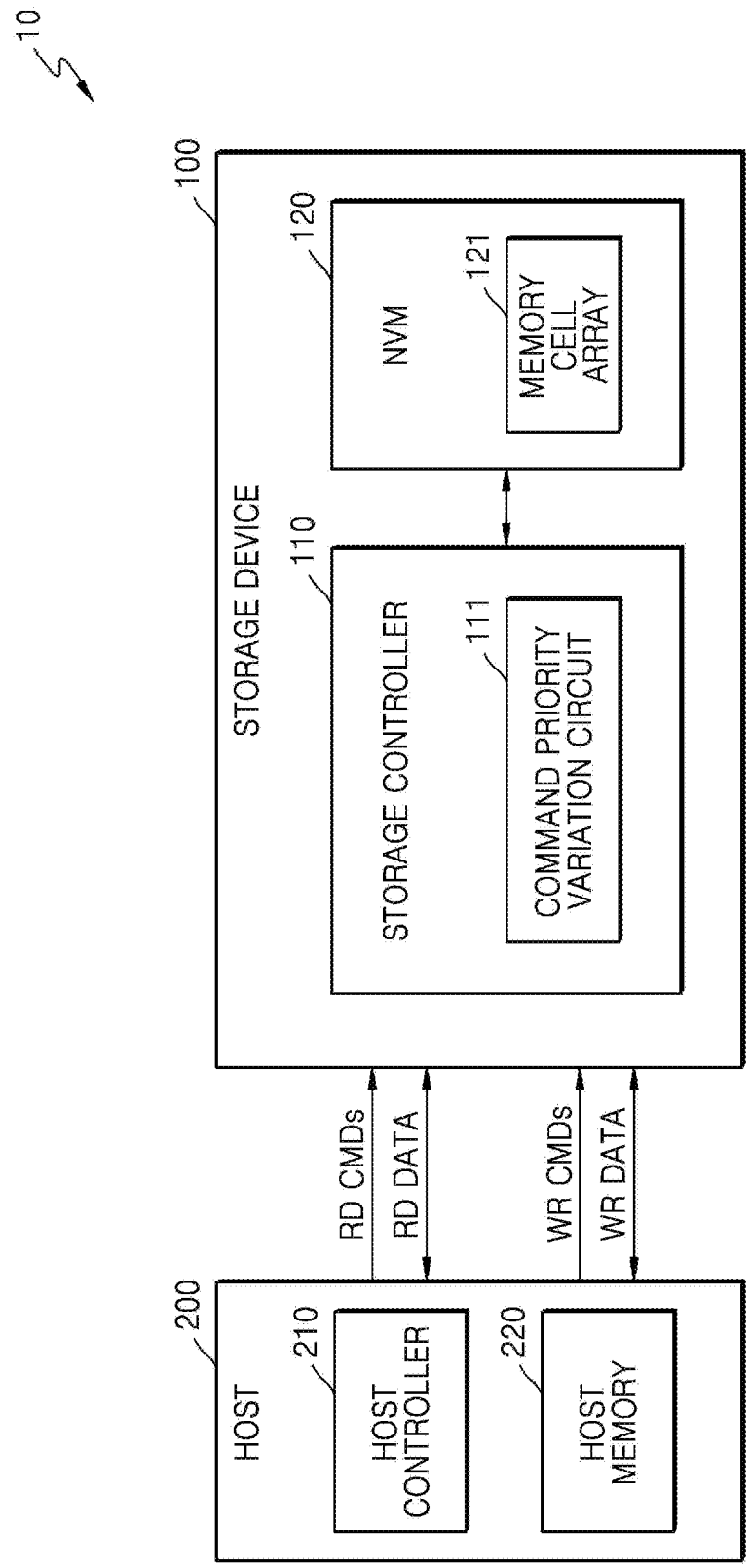
FIG. 1 is a block diagram illustrating a storage system according to an embodiment.

FIG. 1 is a block diagram illustrating a storage system 10 according to an embodiment, which is illustrated as including a storage device 100 and a host 200 and thus may be referred to as a host-storage system. The storage device 100 may include a storage controller 110 and a nonvolatile memory (NVM) 120, and the storage controller 110 and the NVM 120 may be connected to each other through a channel. According to an embodiment, the storage controller 110 may also be referred to as a controller, a device controller, or a memory controller. According to an embodiment, the NVM 120 may be implemented as a plurality of memory chips or a plurality of memory dies. For example, each of the plurality of memory chips may be a Dual Die Package (DDP), a Quadruple Die Package (QDP), or an Octuple Die Package (ODP).

The host 200 may include a host controller 210 and a host memory 220. The host memory 220 may function as a buffer memory for temporarily storing write data WR DATA to be transmitted to the storage device 100 or read data RD DATA received from the storage device 100. As an example, the host controller 210 may be one of a plurality of modules provided in an application processor (AP), and the AP may be implemented as a system on chip (SoC). The host memory 220 may be an embedded memory provided in the AP or may be a NVM or a memory module arranged outside the AP.

According to an embodiment, the host 200 may transmit a plurality of commands to the storage device 100. For example, the host 200 may store data in the storage device 100 by transmitting a plurality of write commands WR CMDs and write data WR DATA to the storage device 100. As another example, the host 200 may transmit a plurality of read commands RD CMDs to the storage device 100 and receive read data RD DATA from the storage device 100 in response to the read commands RD CMDs.

According to an embodiment, the plurality of write commands WR CMDs and the plurality of read commands RD CMDs may be respectively generated from different users. For example, in the case of a data center, the host 200 may be a processing unit inside the data center, and the plurality of read commands RD CMDs may be the respective commands of a plurality of users requesting data from the data center through a wireless network. According to another embodiment, the plurality of write commands WR CMDs and the plurality of read commands RD CMDs may be respectively requested from different applications. The host 200 may simultaneously execute a plurality of applications. For example, the host 200 may simultaneously execute a document program, a video player, and a web browser. In this case, each of the document program, the video player, and the web browser may request a write command WR CMD or a read command RD CMD from the storage device 100.

The storage controller 110 may control the NVM 120 to write the write data WR DATA to a memory cell array 121 of the NVM 120 in response to the plurality of write commands WR CMDs from the host 200. Also, the storage controller 110 may control the NVM 120 to read the data stored in the memory cell array 121 of the NVM 120 and provide the read data RD DATA to the host 200 in response to the plurality of read commands RD CMDs from the host 200. Accordingly, the storage device 100 may include storage media for storing data. As an example, the storage device 100 may include at least one of a solid state drive (SSD), an embedded memory, and a removable external memory. For example, when the storage device 100 is an SSD, the storage device 100 may be a device conforming to the nonvolatile memory express (NVMe) standard. Moreover, when the storage device 100 is an embedded memory or an external memory, the storage device 100 may be a device conforming to the universal flash storage (UFS) or embedded multimedia card (eMMC) standard. The host 200 and the storage device 100 may each generate a packet according to an adopted standard protocol and transmit the same therebetween.

According to an embodiment, in the storage controller 110, a command priority variation circuit 111 may change the priorities between the write commands WR CMDs and the read commands RD CMDs in real time. According to a comparative example, the storage controller 110 preferentially processes the read commands RD CMDs in order to satisfy the user's quality of service (QOS) and prevent an increase in the read latency. Also, the high priority of the read commands RD CMDs is always fixed. However, in the case of processing the commands of a plurality of users or a plurality of applications, various scenarios may be considered and accordingly, the high priority given to the read commands RD CMDs needs to vary.

By monitoring unprocessed commands waiting in the queue among the plurality of write commands WR CMDs and the plurality of read commands RD CMDs, the command priority variation circuit 111 may set a high priority to the write command WR CMD to preferentially process the write command WR CMD or may set a high priority to the read command RD CMD to preferentially process the read command RD CMD. The command priority variation circuit 111 may monitor a queue depth (QD) and vary the priority according to the monitoring result. For example, the command priority variation circuit 111 may monitor an average QD and a QD deviation to determine whether a QD surge has occurred. The QD surge may refer to a QD value temporarily increasing above a threshold value. When the QD increases due to a large number of unprocessed commands accumulated in the queue, the tail latency may tend to increase rapidly and thus the command priority variation circuit 111 may vary the priority of the command in which a QD surge has occurred, to be high. For example, when a QD surge has occurred in the read command RD CMD, the command priority variation circuit 111 may increase the priority of the read command RD CMD to quickly process the read command RD CMD, thereby reducing or preventing the tail latency due to the last read command RD CMD waiting in the queue. As another example, when a QD surge has occurred in the write command WR CMD, the command priority variation circuit 111 may increase the priority of the write command WR CMD to quickly process the write command WR CMD, thereby reducing or preventing the tail latency due to the last write command WR CMD waiting in the queue. The command priority variation circuit 111 is described below in detail.

Figure 2:
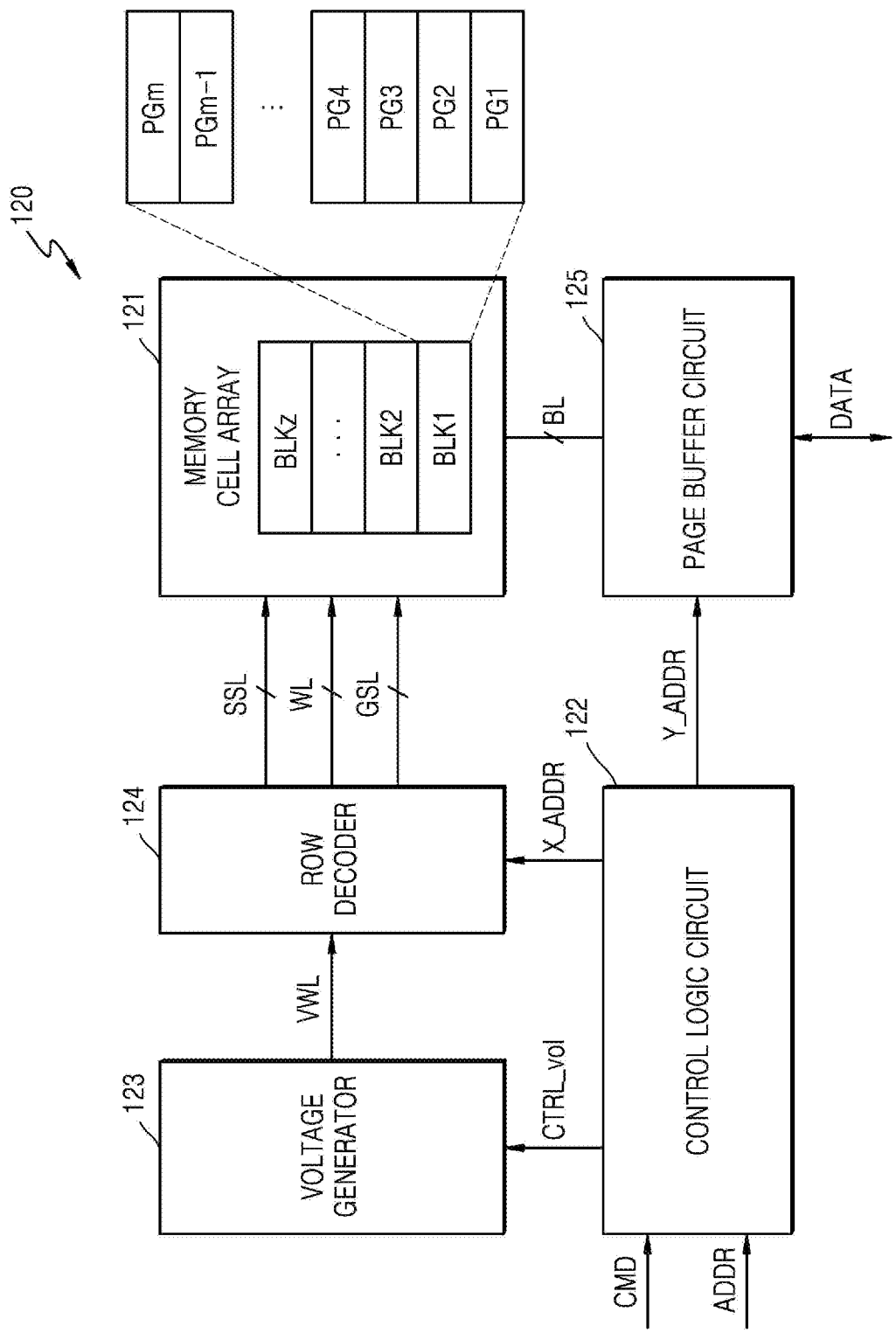
FIG. 2 is a block diagram illustrating a nonvolatile memory according to an embodiment.

FIG. 2 is a block diagram illustrating a NVM 120 according to an embodiment. Referring to FIG. 2, the NVM 120 may include a memory cell array 121, a control logic circuit 122, a voltage generator 123, a row decoder 124, and a page buffer circuit 125. Although not illustrated in FIG. 2, the NVM 120 may further include a memory interface circuit and also may further include a column logic, a pre-decoder, a temperature sensor, a command decoder, an address decoder, and the like.

The memory cell array 121 may include a plurality of memory blocks BLK1 to BLKz, and each of the plurality of memory blocks BLK1 to BLKz may include a plurality of pages PG1 to PGm, where z and m may be positive integers and may vary according to embodiments. For example, a memory block may be an erase unit, and a page may be a write and read unit. The memory cell array 121 may be connected to the page buffer circuit 125 through bit lines BL and may be connected to the row decoder 124 through word lines WL, string selection lines SSL, and ground selection lines GSL.

In an embodiment, the memory cell array 121 may include a three-dimensional (3D) memory cell array, and the 3D memory cell array may include a plurality of NAND strings. Each NAND string may include memory cells respectively connected to word lines vertically stacked on a substrate. The 3D memory cell array is described in more detail with reference to FIG. 3.

In an embodiment, the memory cell array 121 may include a two-dimensional (2D) memory cell array, and the 2D memory cell array may include a plurality of NAND strings arranged in the row and column directions. The 2D memory cell array is described in more detail with reference to FIG. 8. In some embodiments, the memory cell array 121 may include various other types of nonvolatile memories and accordingly, the NVM 120 may include magnetic RAMs (MRAMs), spin-transfer torque MRAMs, conductive bridging RAMs (CBRAMs), ferroelectric RAMs (FeRAMs), phase RAMs (PRAMs), resistive RAMs, and other types of memories.

The control logic circuit 122 may generally control various operations in the NVM 120. The control logic circuit 122 may output various control signals in response to a command CMD and/or an address ADDR. For example, the control logic circuit 122 may output a voltage control signal CTRL_vol, a row address X_ADDR, and a column address Y_ADDR. The voltage generator 123 may generate various types of voltages for performing program, read, and erase operations based on the voltage control signal CTRL_vol. For example, the voltage generator 123 may generate a program voltage, a read voltage, a program verify voltage, an erase voltage, or the like as a word line voltage VWL.

The row decoder 124 may select one of a plurality of word lines WL and one of a plurality of string selection lines SSL in response to the row address X_ADDR. For example, the row decoder 124 may apply a program voltage and a program verify voltage to a selected word line in a program operation and may apply a read voltage to a selected word line in a read operation. The page buffer circuit 125 may select at least one bit line from among the bit lines BL in response to the column address Y_ADDR. The page buffer circuit 125 may operate as a write driver or as a sense amplifier according to an operation mode.

Figure 3:
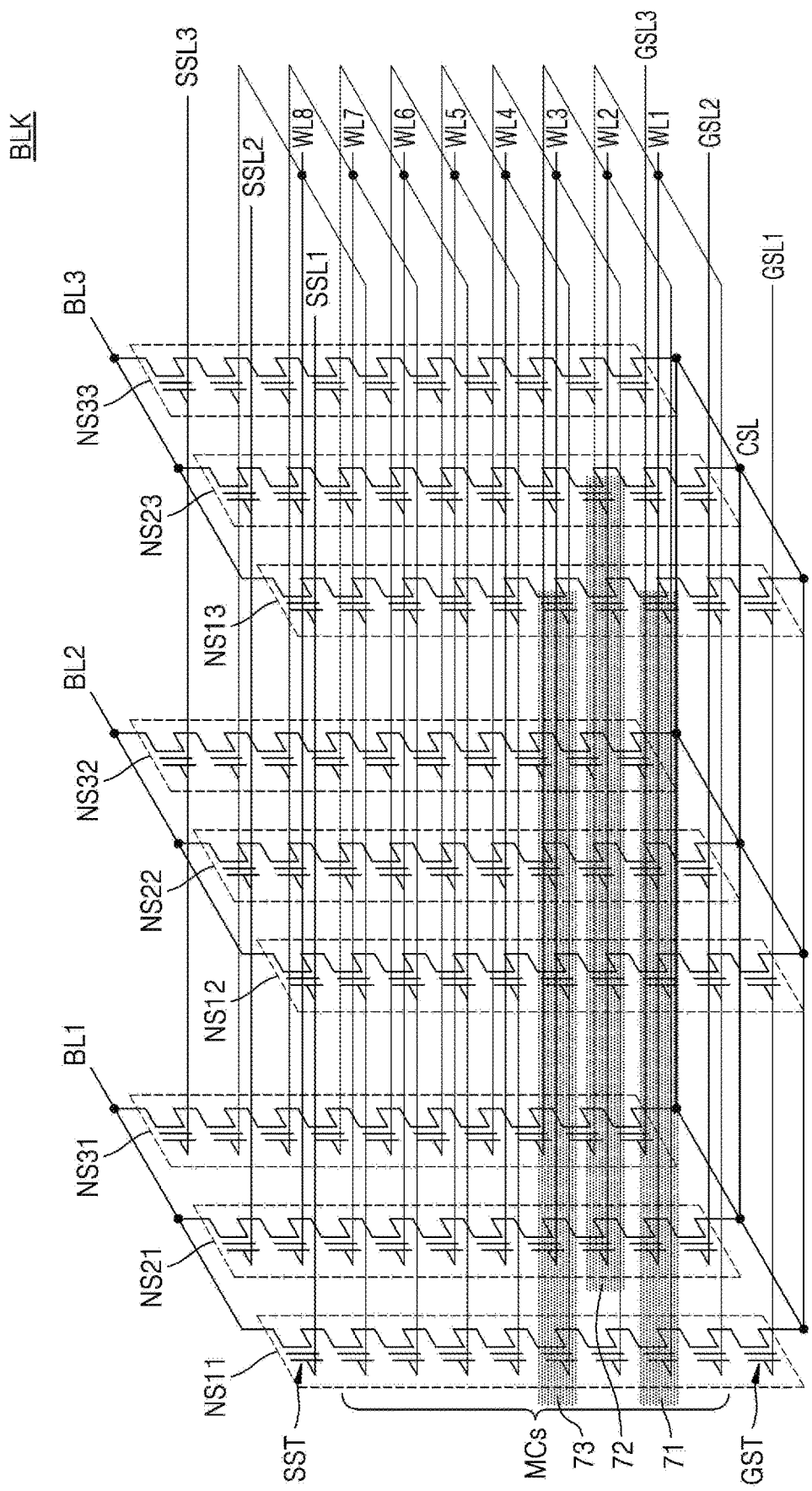
FIG. 3 is a circuit diagram illustrating a memory block BLK according to an embodiment.

FIG. 3 is a circuit diagram illustrating a memory block BLK according to an embodiment. Referring to FIG. 3, the memory block BLK may be a vertical-structure NAND flash memory and may correspond to one of the plurality of memory blocks SBLK1 to SBLKz of FIG. 2. The memory block BLK may include NAND strings NS11 to NS33, and each NAND string (e.g., NS11) may include a string selection transistor SST, a plurality of memory cells MCs, and a ground selection transistor GST connected in series. The transistors SST and GST and the memory cells MCs included in each NAND string may form a stack structure on a substrate in the vertical direction.

Bit lines BL1 to BL3 may extend in a first direction, and word lines WL1 to WL8 may extend in a second direction. The NAND strings NS11, NS21, and NS31 may be between the first bit line BL1 and a common source line CSL, the NAND strings NS12, NS22, and NS32 may be between the second bit line BL2 and the common source line CSL, and the NAND strings NS13, NS23, and NS33 may be between the third bit line BL3 and the common source line CSL.

The string selection transistor SST may be connected to string selection lines SSL1 to SSL3 corresponding thereto. The memory cells MCs may be respectively connected to the word lines WL1 to WL8 corresponding thereto. The ground selection transistor GST may be connected to ground selection lines GSL1 to GSL3 corresponding thereto. The string selection transistor SST may be connected to the corresponding bit line, and the ground selection transistor GST may be connected to the common source line CSL. Herein, the number of NAND strings, the number of word lines, the number of bit lines, the number of ground selection lines, and the number of string selection lines may vary according to embodiments.

Figure 4:
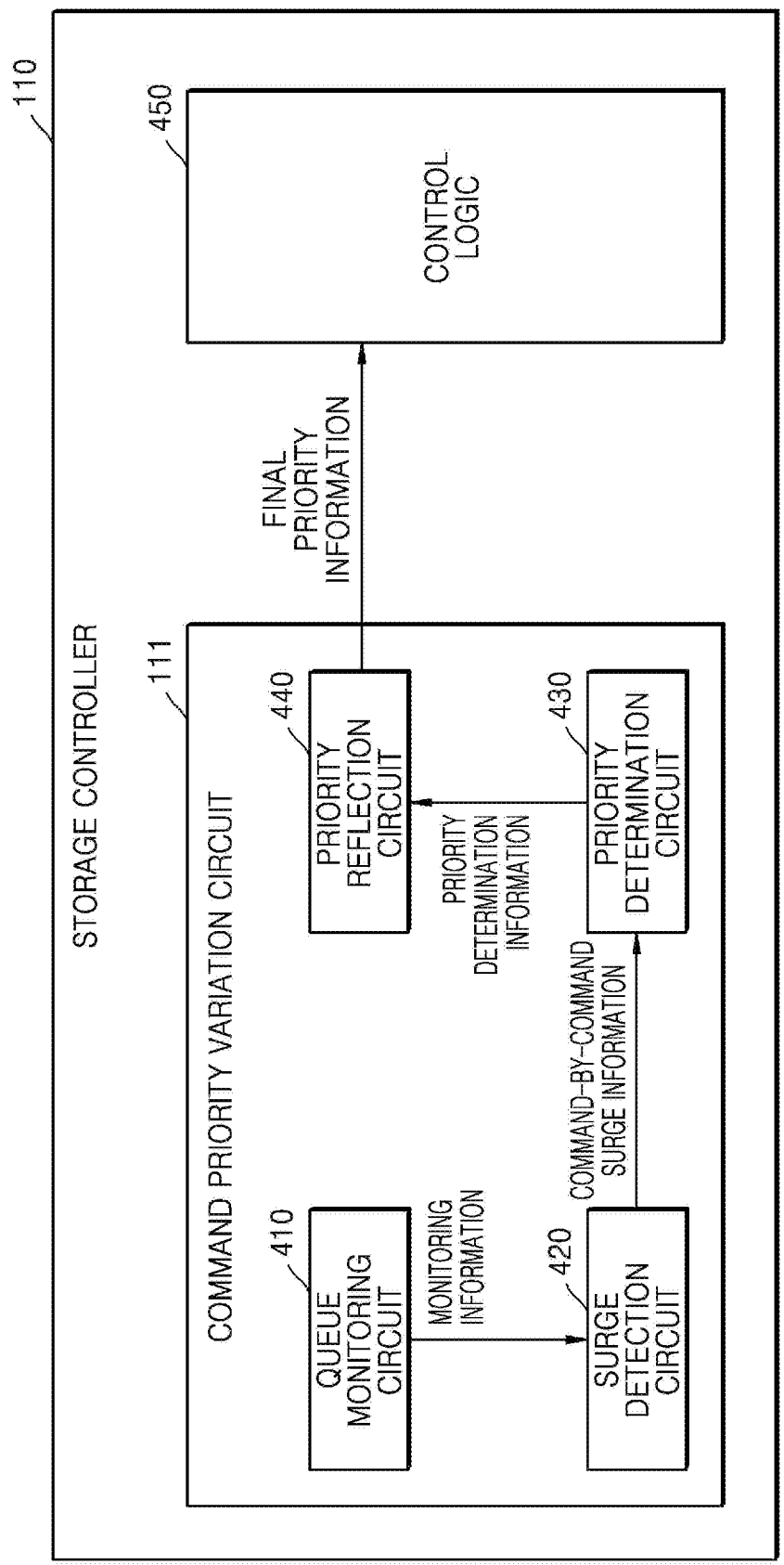
FIG. 4 is a block diagram illustrating a storage controller according to an embodiment.

FIG. 4 is a block diagram illustrating a storage controller 110 according to an embodiment. Referring to FIG. 4, the command priority variation circuit 111 of FIG. 1 may include a queue monitoring circuit 410, a surge detection circuit 420, a priority determination circuit 430, and a priority reflection circuit 440. The queue monitoring circuit 410 may measure a QD or latency by monitoring the commands waiting in the queue. For example, the queue monitoring circuit 410 may obtain an average read QD and an average read deviation for read commands RD CMDs among the waiting commands. The queue monitoring circuit 410 may obtain an average write QD and an average write deviation for write commands WR CMDs among the waiting commands. The queue monitoring circuit 410 may provide monitoring information to the surge detection circuit 420, and the monitoring information may include the average read QD, the average read deviation, the average write QD, and the average write deviation.

The surge detection circuit 420 may detect a surge of the read commands RD CMDs based on the monitoring information. For example, the surge detection circuit 420 may calculate a read QD surge value based on the average read QD and the average read deviation among the monitoring information, and then determine whether a surge has occurred in the read command RD CMD queue, according to the comparison result between the read QD surge value and a threshold value. The surge detection circuit 420 may determine the occurrence of a surge according to Equation 1.

$$RQDSV = ((|avg\ RD\ QD - avg\ RD\ QD\ deviation|) \div avg\ RD\ QD) > Th, \quad \text{Equation 1}$$

where: 'avg RD QD' denotes an average read QD, 'avg RD QD deviation' denotes an average read QD deviation, 'Th' denotes a threshold value, and RQDSV denotes a read QD surge value.

When the read QD surge value is greater than the threshold value, the surge detection circuit 420 may determine that a surge has been detected in the read command RD CMD queue. That is, when the read QD surge value is greater than the threshold value, the number of read commands RD CMDs waiting in the queue may increase rapidly as a result of the "surge."

The surge detection circuit 420 may detect a surge of the read commands WR CMDs based on the monitoring information. For example, the surge detection circuit 420 may calculate a write QD surge value based on the average write QD and the write QD deviation among the monitoring information and determine whether a surge has occurred in the write command WR CMD queue, according to the comparison result between the write QD surge value and a threshold value. The surge detection circuit 420 may determine the occurrence of a surge according to Equation 2.

$$WQDSV = ((|avg\ WR\ QD - avg\ WR\ QD\ deviation|) \div avg\ WD\ QD) > Th,$$

where: 'avg WR QD' denotes an average write QD, 'avg WR QD deviation' denotes an average write QD deviation, 'Th' denotes a threshold value, and WQDSV denotes a write QD surge value.

When the write QD surge value is greater than the threshold value, the surge detection circuit 420 may determine that a surge has been detected in the write command (WR CMD) queue. That is, when the write QD surge value is greater than the threshold value, the number of write commands WR CMDs waiting in the queue may increase rapidly as a result of the "surge."

In the above embodiment, the threshold value of Equation 1 and the threshold value of Equation 2 are illustrated as being equal to each other; however, the inventive concept is not limited thereto. For example, the threshold value of Equation 1 may be different from the threshold value of Equation 2 in some embodiments. The storage controller 110 may set a low threshold value of the command to be improved in latency. For example, in order to manage the read latency, the storage controller 110 may increase the number of surge detections by setting the threshold value of Equation 1 to be low and may perform control such that the priority of the read command RD CMD may be set to be usually high.

The surge detection circuit 420 may generate command-by-command surge information indicating whether a surge occurs in each of the write command WR CMD and the read command RD CMD, and provide the command-by-command surge information to the priority determination circuit 430.

The priority determination circuit 430 may generate priority determination information based on the command-by-command surge information. The priority determination information may be information indicating whether to set a high priority to the read command RD CMD, whether to set a high priority to the write command WR CMD, or whether to set the priority of the read command RD CMD and the write command WR CMD to an initial value. The priority determination circuit 430 may set a high priority to the command in which a surge has occurred. For example, a surge may occur in the write command WR CMD, even when a surge does not occur in the read command RD CMD. The priority determination circuit 430 may increase the priority of the write command WR CMD in which a surge has occurred. As another example, a surge may or may not occur in both the write command WR CMD and the read command RD CMD. That is, the write QD value of the write command WR CMD and the read QD value of the read command RD CMD may be stably maintained without a rapid increase or decrease. The priority determination circuit 430 may maintain the priority of the write command WR CMD and the read command RD CMD, or may change the priority thereof according to a preset initial priority.

The priority reflection circuit 440 may change the priority of the write command WR CMD and the read command RD CMD according to the priority determination information received from the priority determination circuit 430. For example, before the priority determination information is received, the priority of the read command RD CMD may be higher than the priority of the write command WR CMD. The priority reflection circuit 440 may receive the priority determination information and identify that the priority determination information indicates the write command WR CMD. The priority reflection circuit 440 may change the priority of the write command WR CMD to be higher than the priority of the read command RD CMD, based on the priority determination information. The priority reflection circuit 440 may generate final priority information indicating the write command WR CMD and the read command RD CMD changed based on the priority determination information and provide the final priority information to a control logic 450.

The control logic 450 may change a plurality of setting values based on the final priority information. According to embodiments, the control logic 450 may identify that the priority of the write command WR CMD is higher than the priority of the read command RD CMD, based on the final priority information. The control logic 450 may change a plurality of setting values in order to preferentially process the write command WR CMD. For example, the control logic 450 may set the weight of the write command WR CMD to be high by changing the setting value of the command-by-command weight.

Figure 5:
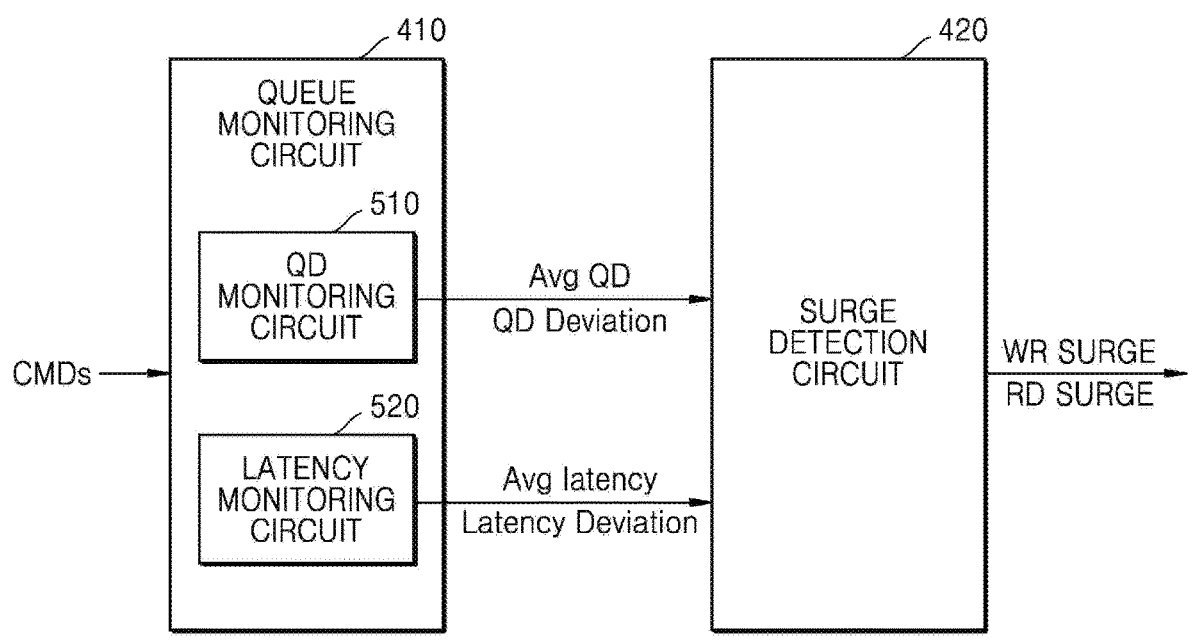
FIG. 5 is a block diagram illustrating a queue monitoring circuit and a surge detection circuit according to an embodiment.

FIG. 5 is a block diagram illustrating a queue monitoring circuit 410 and a surge detection circuit 420 according to an embodiment. Referring to FIG. 5, the queue monitoring circuit 410 may further include a QD monitoring circuit 510 and a latency monitoring circuit 520.

The QD monitoring circuit 510 may generate an average QD and QD deviation by using the write commands WR CMDs and the read commands RD CMDs waiting in a command queue (not illustrated). For example, the QD monitoring circuit 510 may calculate an average write QD by identifying the number of write commands WR CMDs waiting in a command queue (not illustrated) during the measurement window. The QD monitoring circuit 510 may obtain a write QD deviation by calculating the difference between the maximum value and the minimum value of the number of write commands WR CMDs waiting in a command queue (not illustrated) during the measurement window.

As another example, the QD monitoring circuit 510 may calculate an average read QD by identifying the number of read commands RD CMDs waiting in a command queue (not illustrated) during the measurement window. The QD monitoring circuit 510 may obtain a QD read deviation by calculating the difference between the maximum value and the minimum value of the number of read commands RD CMDs waiting in a command queue (not illustrated) during the measurement window. The QD monitoring circuit 510 may provide an average QD including the average read QD and the average write QD and a QD deviation including the write QD deviation and the read QD deviation to the surge detection circuit 420.

The latency monitoring circuit 520 may generate an average latency and an average latency deviation by monitoring the latency of the executed write commands WR CMDs and read commands RD CMDs. For example, the QD monitoring circuit 510 may calculate an average write latency by identifying the latency of the write commands WR CMDs executed during the measurement window. The QD monitoring circuit 510 may obtain a write latency deviation by calculating the difference between the maximum latency and the minimum latency of the executed write commands WR CMDs during the measurement window.

As another example, the QD monitoring circuit 510 may calculate an average read latency by identifying the latency of the read commands RD CMDs executed during the measurement window. The QD monitoring circuit 510 may obtain a read latency deviation by calculating the difference between the maximum latency and the minimum latency of the executed read commands RD CMDs during the measurement window. The QD monitoring circuit 510 may provide an average QD including the average read QD and the average write QD and a latency deviation including the write latency deviation and the read latency deviation to the surge detection circuit 420.

The surge detection circuit 420 may determine whether a surge has occurred in the write command WR CMD, based on the average write QD and the write latency deviation. When detecting that a surge has occurred in the write command WR CMD, the surge detection circuit 420 may generate a write surge signal WR SURGE. The surge detection circuit 420 may determine whether a surge has occurred in the read command RD CMD, based on the average read QD and the read latency deviation. When detecting that a surge has occurred in the read command RD CMD, the surge detection circuit 420 may generate a read surge signal RD SURGE.

Figure 6:
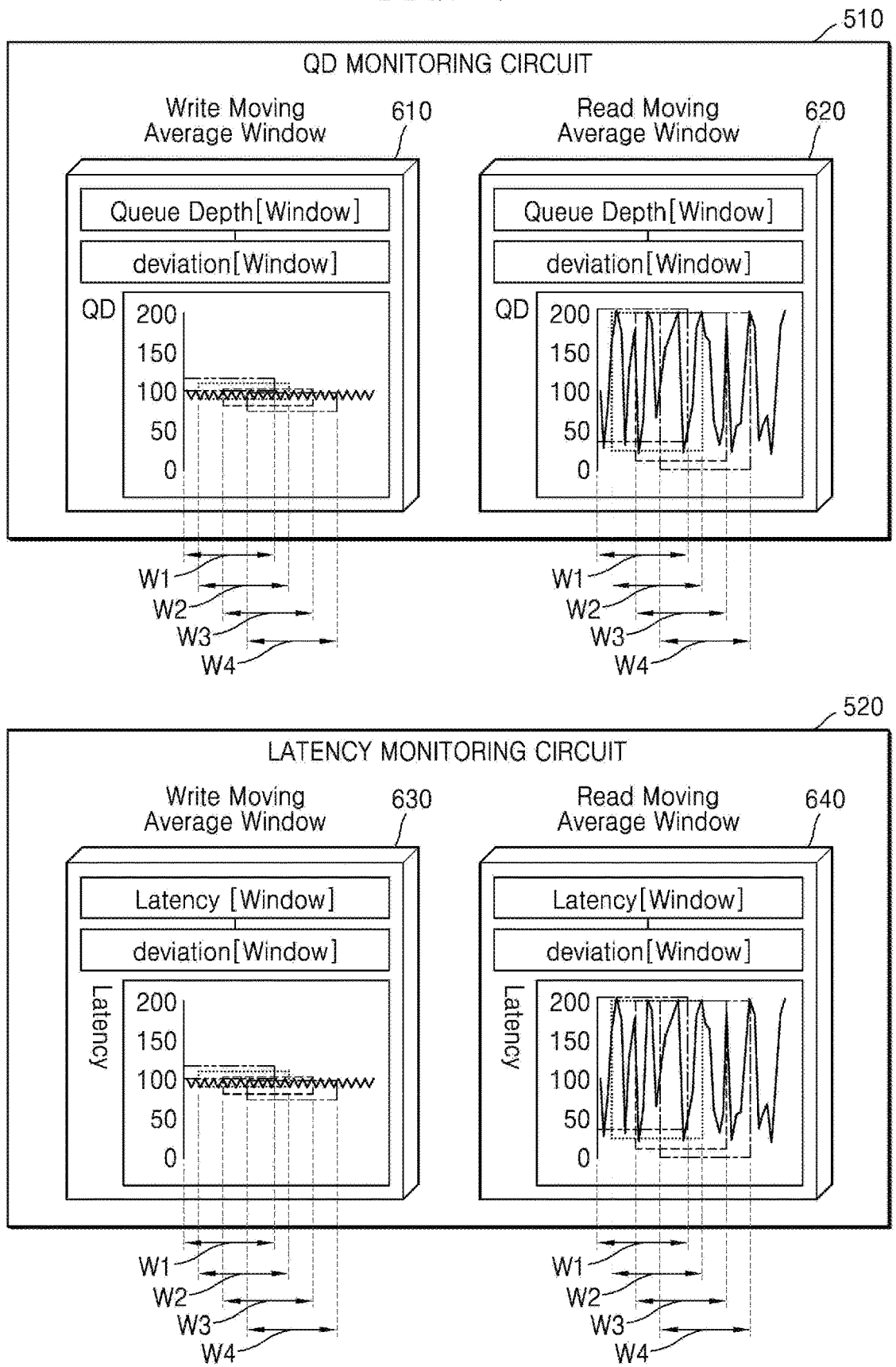
FIG. 6 illustrates an example of a queue depth (QD) monitoring circuit and a latency monitoring circuit according to an embodiment.

FIG. 6 illustrates an example of the QD monitoring circuit 510 and the latency monitoring circuit 520 according to an embodiment. Referring to FIG. 6, the QD monitoring circuit 510 may include a first write monitoring circuit 610 and a first read monitoring circuit 620. The first write monitoring circuit 610 may monitor the write commands WR CMDs waiting in a command queue (not illustrated), and the first read monitoring circuit 620 may monitor the read commands RD CMDs waiting in a command queue (not illustrated).

According to an embodiment, the first write monitoring circuit 610 may obtain each of an average write QD and a write QD deviation of the write commands WR CMDs waiting in the command queue during first to fourth windows W1 to W4. The size of each of the first to fourth windows W1 to W4 may be variably set, and the number of measurement windows may also be variably set. The first write monitoring circuit 610 may provide the average write QD and the write QD deviation obtained during a plurality of windows to the surge detection circuit 420. The surge detection circuit 420 may determine whether a surge has occurred in the write commands WR CMDs, based on the average write QD and the write QD deviation.

According to an embodiment, the first read monitoring circuit 620 may obtain each of an average read QD and a read QD deviation of the read commands RD CMDs waiting in the command queue during first to fourth windows W1 to W4. The size of each of the first to fourth windows W1 to W4 may be variably set, and the number of measurement windows may also be variably set. The first read monitoring circuit 620 may provide the average read QD and the read QD deviation obtained during a plurality of windows to the surge detection circuit 420. The surge detection circuit 420 may determine whether a surge has occurred in the read commands RD CMDs, based on the average read QD and the read QD deviation.

The latency QD monitoring circuit 510 may include a second write monitoring circuit 630 and a second read monitoring circuit 640. The second write monitoring circuit 630 may monitor the write commands WR CMDs executed during the measurement window, and the second read monitoring circuit 640 may monitor the read commands RD CMDs executed during the measurement window.

According to an embodiment, the second write monitoring circuit 630 may obtain each of an average write latency and a write latency deviation of the write commands WR CMDs executed during first to fourth windows W1 to W4. The size of each of the first to fourth windows W1 to W4 may be variably set, and the number of measurement windows may also be variably set. The second write monitoring circuit 630 may provide the average write latency and the write latency deviation obtained during a plurality of windows to the surge detection circuit 420. The surge detection circuit 420 may determine whether a surge has occurred in the write commands WR CMDs, based on the average write latency and the write latency deviation.

According to an embodiment, the second read monitoring circuit 640 may obtain each of an average read latency and a read latency deviation of the read commands RD CMDs executed during first to fourth windows W1 to W4. The size of each of the first to fourth windows W1 to W4 may be variably set, and the number of measurement windows may also be variably set. The second read monitoring circuit 640 may provide the average read latency and the read latency deviation obtained during a plurality of windows to the surge detection circuit 420. The surge detection circuit 420 may determine whether a surge has occurred in the read commands RD CMDs, based on the average read latency and the read latency deviation.

Figure 7A:
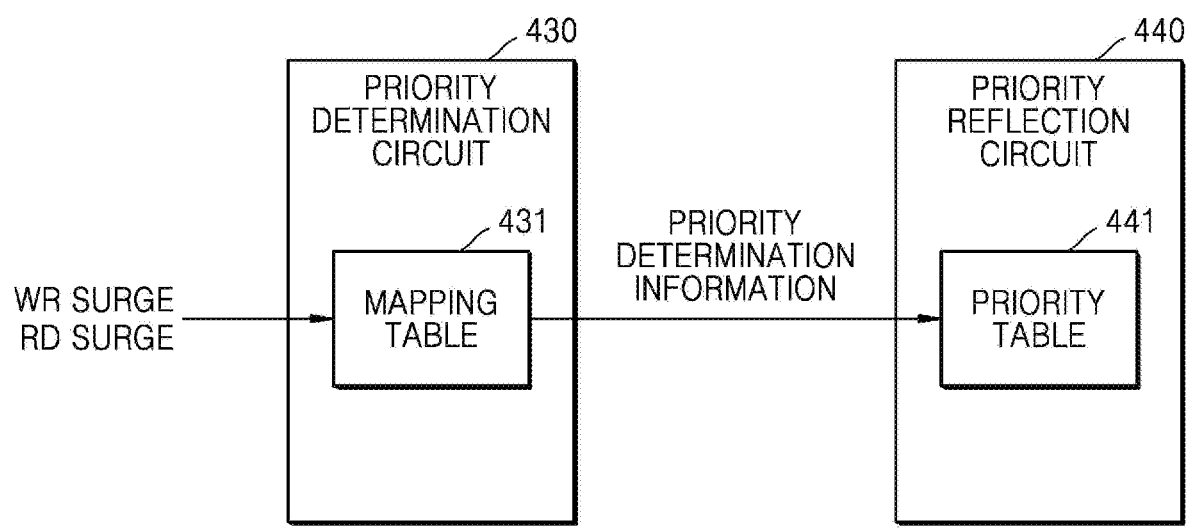
FIG. 7A is a block diagram illustrating a priority determination circuit and a priority reflection circuit according to an embodiment.

FIG. 7A is a block diagram illustrating a priority determination circuit 430 and a priority reflection circuit 440 according to an embodiment. Referring to FIG. 7A, the priority determination circuit 430 may include a mapping table 431. The mapping table 431 may store priority command information pre-mapped according to command-by-command surge information.

For example, referring to FIG. 7B together, when a surge occurs in the read command RD CMD and a surge does not occur in the write command WR CMD, the higher priority command may be the read command RD CMD. That is, because a surge has occurred only in the read command RD CMD, the command priority variation circuit 111 may increase the priority of the read command RD CMD to decrease the number of waiting read commands RD CMDs.

As another example, when a surge occurs in the write command WR CMD and a surge does not occur in the read command RD CMD, the higher priority command may be the write command WR CMD. That is, because a surge has occurred only in the write command WR CMD, the command priority variation circuit 111 may increase the priority of the write command WR CMD to decrease the number of waiting write commands WR CMDs.

As another example, when a surge has or has not occurred in both the write command WR CMD and the read command RD CMD, the priority command may be a default. That is, because the command priority variation circuit 111 may not reduce the wait queue by increasing the priority of only one of the write command WR CMD and the read command RD CMD, it may reset each of the write command WR CMD and the read commands RD CMD to an initial priority value. However, the inventive concept is not limited thereto, and the priority determination circuit 430 may select any one of the write command WR CMD and the read command RD CMD as the higher priority command. For example, when a surge has occurred in both the write command WR CMD and the read command RD CMD, the priority determination circuit 430 may increase the priority of the command having a great average QD value. Alternatively, the priority determination circuit 430 may increase the priority of the command corresponding to a great QD deviation among the write QD deviation and the read QD deviation.

The priority determination circuit 430 may provide priority determination information to a priority table 441 of the priority reflection circuit 440. The priority determination information may include information indicating one of the read command RD CMD, the write command WR CMD, and the default.

Figure 7C:
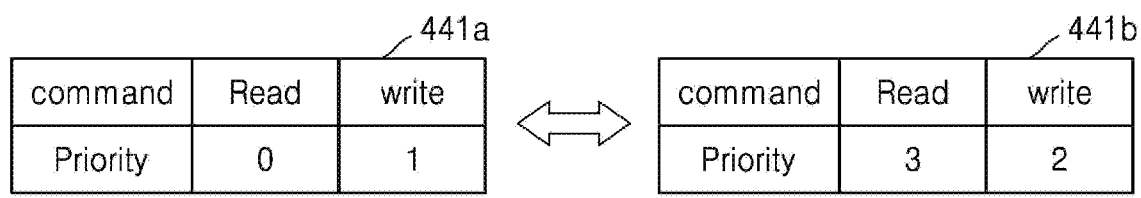
FIG. 7C illustrates a priority table according to priority determination information according to an embodiment.

Referring to FIG. 7C together, the priority table 441 according to priority determination information is illustrated. For example, the priority determination information may include information indicating the read command RD CMD, and a first table 441a before the reception of the priority determination information may store a write command WR CMD priority of level 1 and a read command RD CMD priority of level 0. The priority reflection circuit 440 may change the priority value as illustrated in a second table 441b, based on the priority determination information including information indicating the read command RD CMD. For example, the second table 441b may store the priority of a read command RD CMD priority of level 3 and a write command WR CMD priority of level 2.

Figure 8:
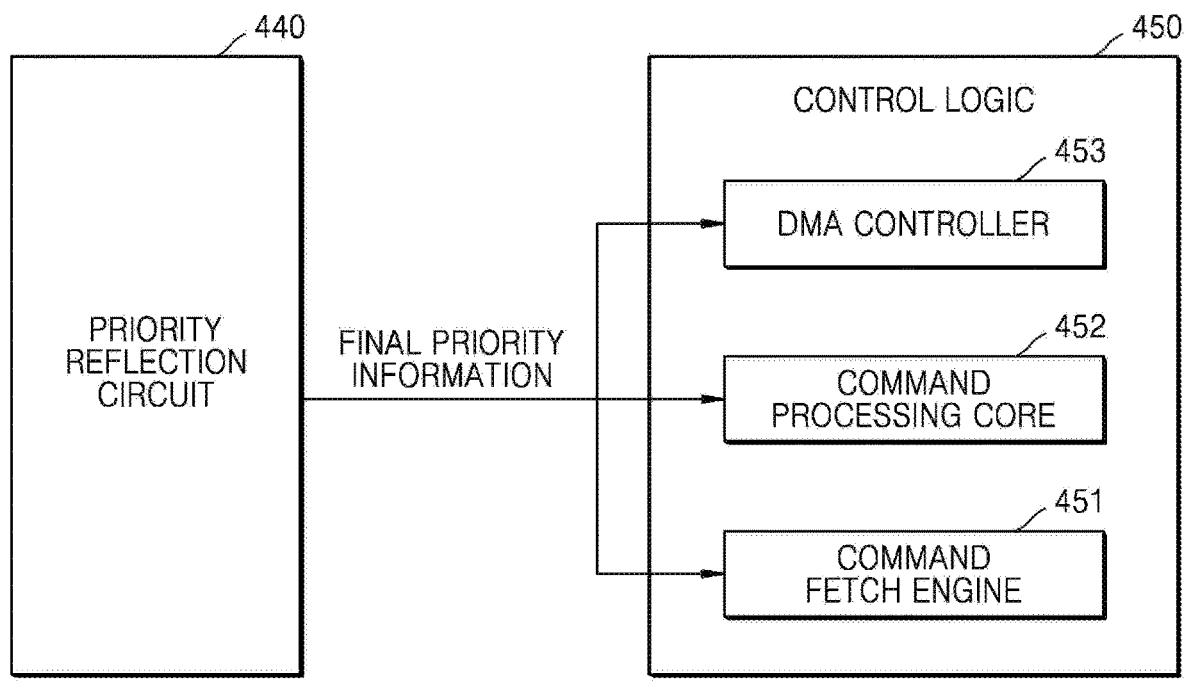
FIG. 8 is a block diagram illustrating a priority reflection circuit and a control logic according to an embodiment.

FIG. 8 is a block diagram illustrating a priority reflection circuit 440 and a control logic 450 according to an embodiment. Referring to FIG. 8, the priority reflection circuit 440 may provide final priority information to the control logic 450. The final priority information may include command-by-command priority values in the second table 441b of FIG. 7C. For example, the final priority information may include information indicating each of the read command RD CMD having a priority of level 3 and the write command WR CMD having a priority of level 2.

According to an embodiment, the control logic 450 may at least include a command fetch engine 451, a command processing core 452, and a direct memory access (DMA) controller 453. The control logic 450 may further include a plurality of engines and a plurality of processing cores for performing the operation of the storage controller 110. The final priority information may be provided to each of the command fetch engine 451, the command processing core 452, and the DMA controller 453 of the control logic 450.

The command fetch engine 451 may change a fetch weight based on the final priority information. For example, based on the final priority information, the command fetch engine may set the weight of the read command RD CMD to be 1.5 times higher than the weight of the write command WR CMD.

The command processing core 452 may change the number of active cores based on the final priority information. For example, based on the final priority information, the command processing core 452 may set the number of active cores processing the read command RD CMD to be 1.5 times greater than the number of active cores processing the write command WR CMD. As another example, the command processing core 452 may increase an interruption count and an interruption time when the priority of the read command RD CMD is high. The interruption count and the interruption time may respectively indicate the number of times and the time for temporarily pausing a program or erase operation and preferentially processing a read request when there is a read request while a program or erase operation is performed. Thus, when the interruption count and interruption time are increased, the read command RD CMD requested on the way may be preferentially processed. Thus, the command processing core 452 may increase the interruption time and the interruption count when the priority of the read command RD CMD is high and may decrease the interruption time and the interruption count when the priority of the read command RD CMD is low.

Figure 9:
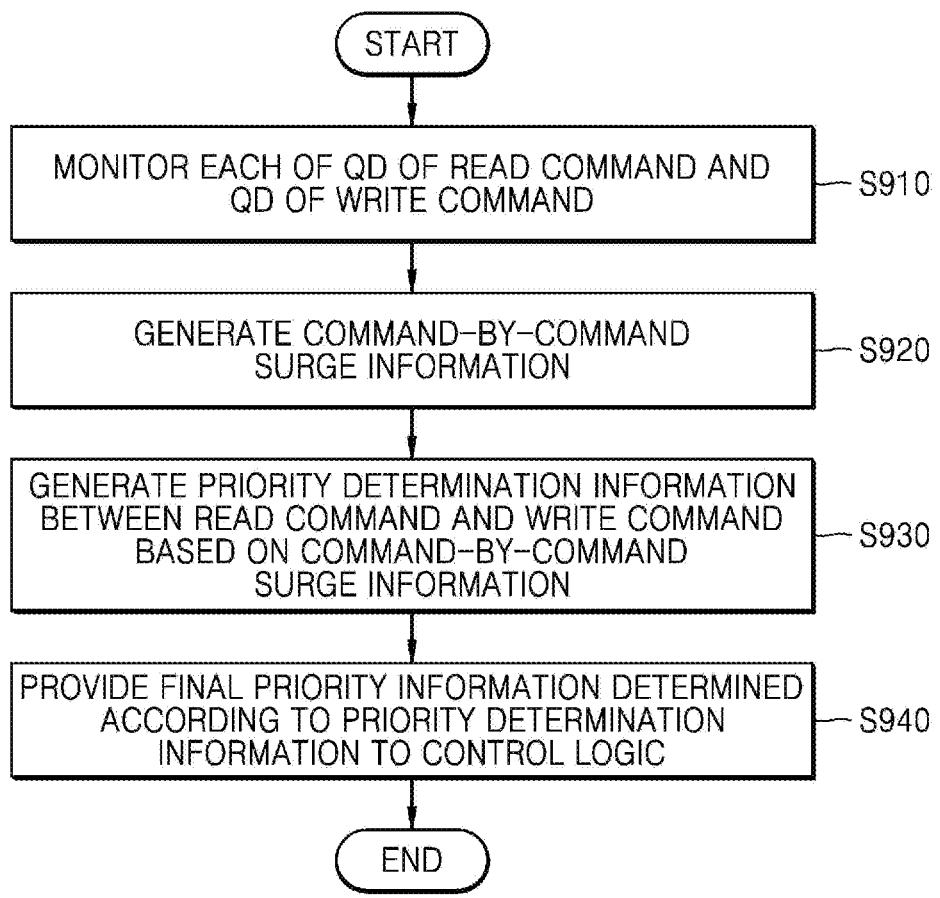
FIG. 9 is a flowchart illustrating an operating method of a storage controller according to an embodiment.

FIG. 9 is a flowchart illustrating an operating method of a storage controller 110 according to an embodiment. Referring to FIG. 9, in operation S910, the storage controller 110 may monitor each of the QD of the read command and the QD of the write command. For example, the storage controller 110 may calculate an average write QD by monitoring the number of write commands WR CMDs waiting in the command queue and may calculate a write QD deviation based on the difference between the maximum value and the minimum value of the number of write commands WR CMDs waiting therein. As another example, the storage controller 110 may calculate an average read QD by monitoring the number of read commands RD CMDs waiting in the command queue and may calculate a read QD deviation based on the difference between the maximum value and the minimum value of the number of read commands RD CMDs waiting therein.

In operation S920, the storage controller 110 may generate command-by-command surge information. As for the command-by-command surge information, the storage controller 110 may determine whether a surge has occurred in each of the read command RD CMD and the write command WR CMD.

The storage controller 110 may determine that a surge has occurred in the write command WR CMD, based on the average write QD and the write QD deviation. The surge detection circuit 420 may generate a "logic-high" write surge signal WR SURGE when a surge has occurred in the write command WR CMD, and may generate a "logic-low" write surge signal WR SURGE when a surge has not occurred in the write command WR CMD.

The storage controller 110 may determine that a surge has occurred in the read command RD CMD, based on the average read QD and the read QD deviation. The surge detection circuit 420 may generate a "logic-high" read surge signal RD SURGE when a surge has occurred in the read command RD CMD, and may generate a "logic-low" read surge signal RD SURGE when a surge has not occurred in the read command RD CMD.

In operation S930, the storage controller 110 may generate priority determination information between the read command RD CMD and the write command WR CMD based on the command-by-command surge information. For example, the priority determination circuit 430 may generate priority determination information including information indicating the read command RD CMD, by receiving the "logic-high" read surge signal RD SURGE and the "logic-low" write surge signal WR SURGE. As another example, the priority determination circuit 430 may generate priority determination information including information indicating the write command WR CMD, by receiving the "logic-high" write surge signal WR SURGE and the "logic-low" read surge signal RD SURGE. As another example, the priority determination circuit 430 may generate priority determination information (including information indicating the default), in response to receiving the "logic-high" write surge signal WR SURGE and the "logic-high" read surge signal RD SURGE or receiving the "logic-low" write surge signal WR SURGE and the "logic-low" read surge signal RD SURGE.

In operation S940, the storage controller 110 may provide final priority information determined according to priority determination information to the control logic 450. The priority determination information may include information indicating any one of the default, the read command RD CMD, and the write command WR CMD. The priority reflection circuit 440 may generate final priority information based on the priority determination information. The final priority information may include a priority value of the read command RD CMD and a priority value of the write command WR CMD. The priority reflection circuit 440 may generate the final priority information by varying the priority value of the read command RD CMD and the priority value of the write command WR CMD according to the command indicated by the priority determination information.

Figure 10:
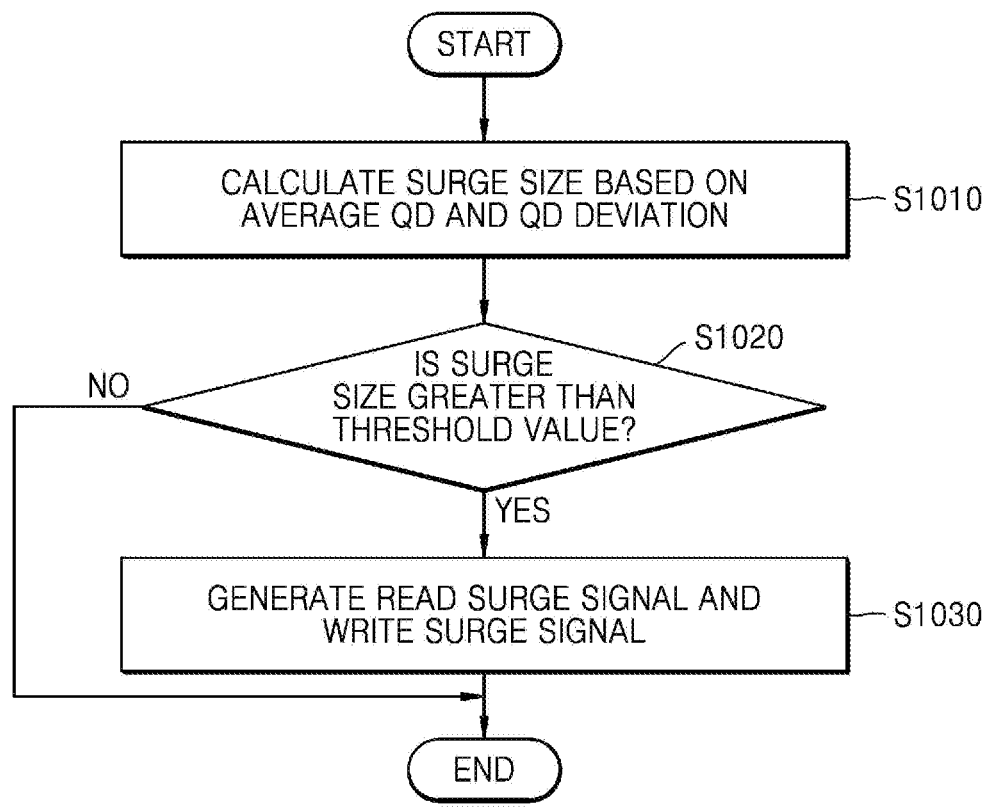
FIG. 10 is a flowchart illustrating an example of an operating method of a storage controller for generating command-by-command surge information according to an embodiment.

FIG. 10 is a flowchart illustrating an example of an operating method of a storage controller 110 for generating command-by-command surge information according to an embodiment. Referring to FIG. 10, in operation S1010, the storage controller 110 may calculate a surge size based on an average QD and a QD deviation. The average QD may include an average write QD of the write command WR CMD and an average read QD of the read command RD CMD. The QD deviation may include a write QD deviation of the write command WR CMD and a read QD deviation of the read command RD CMD. The surge detection circuit 420 may calculate a surge size by dividing the size of the difference value between the average QD and the QD deviation by the size of the average QD. The surge detection circuit 420 may calculate a surge size of the write command WR CMD by using the average QD and the QD deviation of the write command WR CMD and may calculate a surge size of the read command RD CMD by using the average QD and the QD deviation of the read command RD CMD.

In operation S1020, the surge detection circuit 420 may determine whether the surge size is greater than a threshold value. For example, when the calculated surge size is greater than the threshold value, the surge detection circuit 420 may determine that a surge has been detected. As another example, when the calculated surge size is less than the threshold value, the surge detection circuit 420 may determine that a surge has not been detected.

In operation S1030, the surge detection circuit 420 may generate each of a read surge signal RD SURGE and a write surge signal WR SURGE. The surge detection circuit 420 may generate a surge signal indicating the command-by-command surge detection result. According to an embodiment, when a surge is detected in the write command WR CMD, the surge detection circuit 420 may generate a "logic-high" write surge signal WR SURGE, and when the surge is not detected, the surge detection circuit 420 may generate a "logic-low" write surge signal WR SURGE. According to an embodiment, when a surge is detected in the read command RD CMD, the surge detection circuit 420 may generate a "logic-high" read surge signal RD SURGE, and when the surge is not detected, the surge detection circuit 420 may generate a "logic-low" read surge signal RD SURGE.

Figure 11:
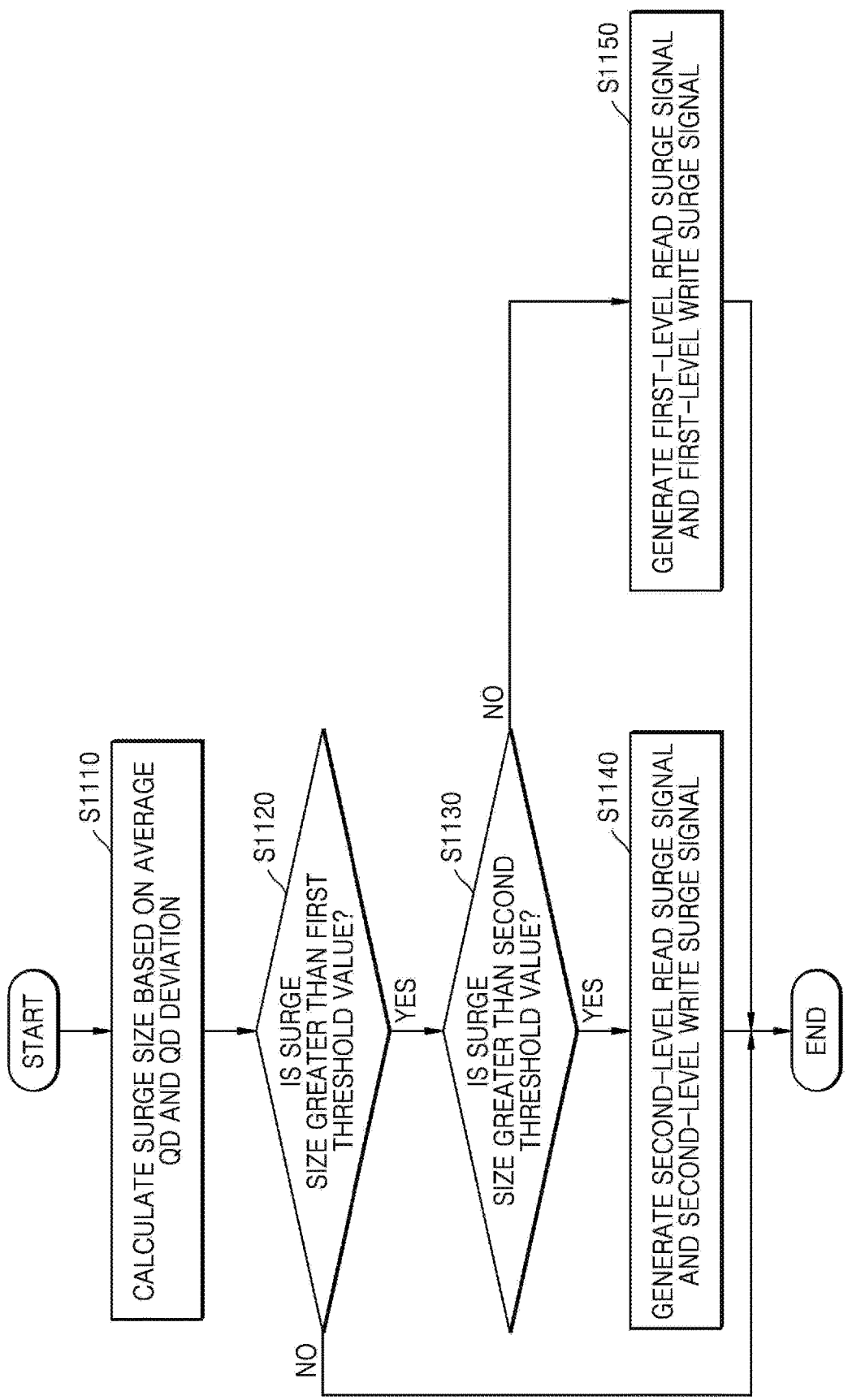
FIG. 11 is a flowchart illustrating an example of an operating method of a storage controller for generating command-by-command surge information according to an embodiment.

FIG. 11 is a flowchart illustrating an example of an operating method of a storage controller 110 for generating command-by-command surge information according to an embodiment. Referring to FIG. 11, in operation S1110, the storage controller 110 may calculate a surge size based on an average QD and a QD deviation. Operation S1110 may be described with reference to operation S1010 of FIG. 10.

In operation S1120, the surge detection circuit 420 may determine whether the surge size is greater than a first threshold value. For example, when the calculated surge size is greater than the first threshold value, the surge detection circuit 420 may determine that a surge has been detected. Thereafter, the surge detection circuit 420 may determine a level of the size of the detected surge through comparison with a second threshold value. As another example, when the calculated surge size is less than the first threshold value, the surge detection circuit 420 may determine that a surge has not been detected.

In operation S1130, the surge detection circuit 420 may determine whether the surge size is greater than a second threshold value. The second threshold value may be greater than the first threshold value in operation S1120. For example, when the calculated surge size is greater than the second threshold value, the surge detection circuit 420 may determine that a strong surge has been detected. As another example, when the calculated surge size is less than the second threshold value, the surge detection circuit 420 may determine that a normal surge has been detected. That is, the surge size of the normal surge may be greater than the first threshold value and less than the second threshold value.

In operation S1140, the surge detection circuit 420 may generate each of a second-level read surge signal RD SURGE and a second-level write surge signal WR SURGE, and in operation S1150, the surge detection circuit 420 may generate each of a first-level read surge signal RD SURGE and a first-level write surge signal WR SURGE. The first-level read surge signal RD SURGE and the first-level write surge signal WR SURGE may be a signal for indicating a normal surge having a size greater than the first threshold value and less than the second threshold value.

The surge detection circuit 420 may generate a surge signal indicating the command-by-command surge detection result. For example, when the normal surge is detected in the write command WR CMD, the surge detection circuit 420 may generate a write surge signal WR SURGE indicating the first level, and when the surge is not detected, the surge detection circuit 420 may generate a "logic-low" write surge signal WR SURGE. When the normal surge is detected in the read command RD CMD, the surge detection circuit 420 may generate a read surge signal RD SURGE indicating the first level, and when the surge is not detected, the surge detection circuit 420 may generate a "logic-low" read surge signal RD SURGE. As another example, when the strong surge is detected in the write command WR CMD, the surge detection circuit 420 may generate a write surge signal WR SURGE indicating the second level, and when the surge is not detected, the surge detection circuit 420 may generate a "logic-low" write surge signal WR SURGE. When the strong surge is detected in the read command RD CMD, the surge detection circuit 420 may generate a read surge signal RD SURGE indicating the second level, and when the surge is not detected, the surge detection circuit 420 may generate a "logic-low" read surge signal RD SURGE.

Figure 12:
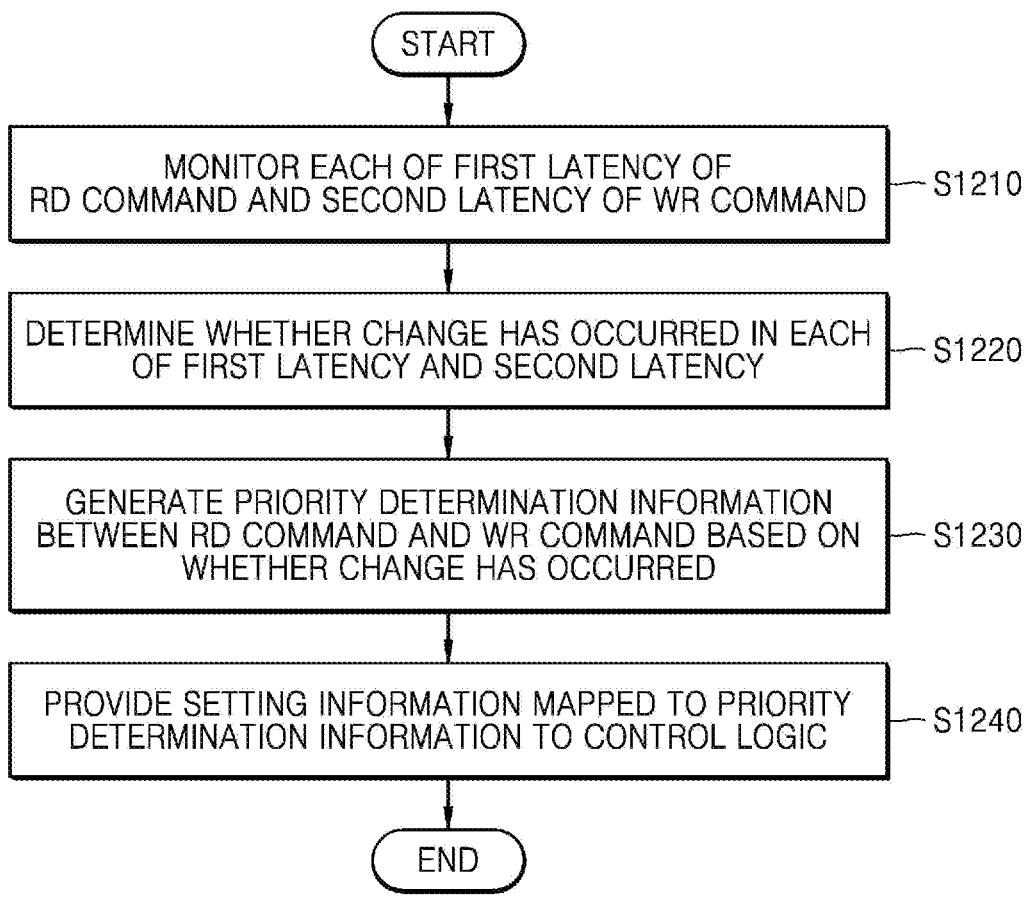
FIG. 12 is a flowchart illustrating an operating method of a storage controller according to an embodiment.

FIG. 12 is a flowchart illustrating an operating method of a storage controller 110 according to an embodiment. Referring to FIG. 12, in operation S1210, the storage controller 110 may monitor a first latency of read command RD CMD and a second latency of write command WR CMD. For example, the storage controller 110 may calculate the second latency by monitoring the number of write commands WR CMDs executed during the measurement window. The storage controller 110 may calculate the first latency by monitoring the number of read commands RD CMDs executed during the measurement window.

In operation S1220, the storage controller 110 may determine whether change has occurred in each of the first latency and the second latency. The determining of the change corresponds to determining whether a surge has occurred in each of the read command RD CMD and the write command WR CMD.

In operation S1230, the storage controller 110 may generate priority determination information between the read command RD CMD and the write command WR CMD based on the occurrence of the change in the first latency and the second latency. For example, the priority determination circuit 430 may generate priority determination information including information indicating the read command RD CMD, by receiving the "logic-high" read surge signal RD SURGE and the "logic-low" write surge signal WR SURGE. As another example, the priority determination circuit 430 may generate priority determination information including information indicating the write command WR CMD, by receiving the "logic-high" write surge signal WR SURGE and the "logic-low" read surge signal RD SURGE. As another example, the priority determination circuit 430 may generate priority determination information including information indicating the default, in response to receiving the "logic-high" write surge signal WR SURGE and the "logic-high" read surge signal RD SURGE or receiving the "logic-low" write surge signal WR SURGE and the "logic-low" read surge signal RD SURGE.

In operation S1240, the storage controller 110 may provide setting information mapped to the priority determination information to the control logic 450. The setting information may include information indicating any one of the default, the read command RD CMD, and the write command WR CMD. For example, the setting information may include a priority value of the read command RD CMD and a priority value of the write command WR CMD.

While the inventive concept has been particularly shown and described with reference to embodiments thereof, it will be understood that various changes in form and details may be made therein without departing from the spirit and scope of the following claims.

What is claimed is:

1. A storage controller, comprising:
a queue monitoring circuit configured to generate monitoring information associated with a queue depth (QD) for at least one of a write command and a read command;
a surge detection circuit configured to use the monitoring information to generate command-by-command surge information;
a priority determination circuit configured to generate priority determination information indicating any one of the write command, the read command, and a default, according to the command-by-command surge information; and
a priority reflection circuit configured to use the priority determination information to variably set a priority of the write command and/or a priority of the read command,
wherein the priority reflection circuit is configured to:
increase the priority of the write command and decrease the priority of the read command, based on the priority determination information indicating the write command,
increase the priority of the read command and decrease the priority of the write command, based on the priority determination information indicating the read command, and
set the priority of the read command to an initial value and set the priority of the write command to an initial value, based on the priority determination information indicating the default.

2. The storage controller of claim 1, wherein the monitoring information includes at least one of: (i) a first average QD and a first QD deviation corresponding to the write command, and (ii) a second average QD and a second QD deviation corresponding to the read command.

3. The storage controller of claim 2, wherein the surge detection circuit generates at least one of: (i) a write surge signal indicating that a surge has occurred in the QD of the write command, and (ii) a read surge signal indicating that a surge has occurred in the QD of the read command.

4. The storage controller of claim 3, wherein the surge detection circuit is configured to: (i) calculate a write surge size by dividing a size between the first average QD and the first QD deviation by the first average QD, and then, when detecting that the write surge size is greater than a threshold value, (ii) generate the write surge signal indicating that a surge has occurred in the QD of the write command, and (iii) calculate a read surge size by dividing a size between the second average QD and the second QD deviation by the second average QD and then, when detecting that the read surge size is greater than a threshold value, (iv) generate the read surge signal indicating that a surge has occurred in the QD of the read command.

5. The storage controller of claim 4, wherein the priority determination circuit is configured to:

generate the priority determination information as indicating the read command when only the read surge signal is received;
generate the priority determination information as indicating the write command when only the write surge signal is received; and
generate the priority determination information indicating the default, in response to both the read surge signal and the write surge signal being received or not being received; and
wherein the default indicates an initial priority of the write command and the read command.

6. The storage controller of claim 1, further comprising control logic configured to vary at least one of: a number of active cores, a command fetch weight, and an interruption count and an interruption time for the read command based on final priority information received from the priority reflection circuit.

7. An operating method of a storage controller, comprising:
generating monitoring information about a queue depth (QD) for at least one of a write command and a read command, wherein the monitoring information includes at least one of: (i) a first average QD and a first QD deviation corresponding to the write command, and (ii) a second average QD and a second QD deviation corresponding to the read command;
generating command-by-command surge information based on the monitoring information;
generating priority determination information indicating any one of the write command, the read command, and a default according to the command-by-command surge information; and
generating final priority information for variably setting each of a priority of the write command and a priority of the read command according to the priority determination information.

8. The operating method of claim 7, wherein the generating of the command-by-command surge information comprises:
generating a write surge signal indicating that a surge has occurred in the QD of the write command; and
generating a read surge signal indicating that a surge has occurred in the QD of the read command.

9. The operating method of claim 8,
wherein the generating of the write surge signal includes calculating a write surge size by dividing a size between the first average QD and the first QD deviation by the first average QD, and detecting that the write surge size is greater than a threshold value; and
wherein the generating of the read surge signal includes calculating a read surge size by dividing a size between the second average QD and the second QD deviation by the second average QD, and detecting that the read surge size is greater than a threshold value.

10. The operating method of claim 9, wherein the generating of the priority determination information includes any one of: (i) generating the priority determination information indicating the read command when only the read surge signal is received, (ii) generating the priority determination information indicating the write command in response to only the write surge signal being received, and (iii) generating the priority determination information indicating the default in response to both the read surge signal and the write surge signal being received or not being received, said default indicating an initial priority of the write command and the read command.

11. The operating method of claim 7, further comprising varying at least one of a number of active cores, a command fetch weight, and an interruption count and an interruption time for the read command based on the final priority information.

12. A storage controller, comprising:
a queue monitoring circuit configured to generate monitoring information about each of a write latency and a read latency, wherein the monitoring information includes at least one of: (i) a first average for the write latency, (ii) a first deviation about the write latency, (iii) a second average for the read latency, and (iv) a second deviation about the read latency;
a surge detection circuit configured to generate command-by-command surge information based on the monitoring information;
a priority determination circuit configured to generate priority determination information indicating any one of a write command, a read command, and a default according to the command-by-command surge information; and
a priority reflection circuit configured to variably set each of a priority of the write command and a priority of the read command according to the priority determination information.

13. The storage controller of claim 12, wherein the surge detection circuit is configured to generate at least one of a write surge signal, which indicates that a surge has occurred in the write latency, and a read surge signal, which indicates that a surge has occurred in the read latency.

14. The storage controller of claim 13, wherein the surge detection circuit is configured to:
calculate a write surge size by dividing a size between the first average for the write latency and the first deviation by the first average, and then, when detecting that the write surge size is greater than a threshold value, generate the write surge signal indicating that a surge has occurred in the write latency, and
calculate a read surge size by dividing a size between the second average for the read latency and the second deviation by the second average, and then, when detecting that the read surge size is greater than a threshold value, generate the read surge signal indicating that a surge has occurred in the read latency.

15. The storage controller of claim 14, wherein the priority determination circuit is configured to:
generate the priority determination information indicating the read command when only the read surge signal is received,
generate the priority determination information indicating the write command when only the write surge signal is received, and
generate the priority determination information indicating the default in response to both the read surge signal and the write surge signal being received or not being received, said default indicating an initial priority of the write command and the read command.

16. The storage controller of claim 12, further comprising control logic configured to vary at least one of a number of active cores, a command fetch weight, and an interruption count and an interruption time for the read command based on final priority information received from the priority reflection circuit.

17. The storage controller of claim 12, wherein the priority reflection circuit is configured to: (i) increase the priority of the write command and decrease the priority of the read command, based on the priority determination information indicating the write command, (ii) increase the priority of the read command and decreases the priority of the write command, based on the priority determination information indicating the read command, and (iii) set the priority of the read command to an initial value and set the priority of the write command to an initial value, based on the priority determination information indicating the default.

* * * * *